Feb. 27, 1934. W. E. URSCHEL 1,948,975
BEAN HARVESTER
Filed Feb. 23, 1929 13 Sheets-Sheet 3

Inventor
William E. Urschel.

Feb. 27, 1934.   W. E. URSCHEL   1,948,975
BEAN HARVESTER
Filed Feb. 23, 1929    13 Sheets-Sheet 5

Feb. 27, 1934.  W. E. URSCHEL  1,948,975
BEAN HARVESTER
Filed Feb. 23, 1929  13 Sheets-Sheet 6

Inventor.
William E. Urschel.

Feb. 27, 1934.  W. E. URSCHEL  1,948,975
BEAN HARVESTER
Filed Feb. 23, 1929  13 Sheets-Sheet 7

Feb. 27, 1934.    W. E. URSCHEL    1,948,975
BEAN HARVESTER
Filed Feb. 23, 1929    13 Sheets-Sheet 9

Inventor.
William E. Urschel.

Feb. 27, 1934.  W. E. URSCHEL  1,948,975
BEAN HARVESTER
Filed Feb. 23, 1929  13 Sheets-Sheet 10

Inventor.
William E. Urschel.

Feb. 27, 1934.  W. E. URSCHEL  1,948,975
BEAN HARVESTER
Filed Feb. 23, 1929  13 Sheets-Sheet 12

Patented Feb. 27, 1934

1,948,975

UNITED STATES PATENT OFFICE 1,948,975

BEAN HARVESTER

William E. Urschel, Valparaiso, Ind.

Application February 23, 1929. Serial No. 342,032

16 Claims. (Cl. 56—19)

The present invention relates to what may be termed collectively as a bean harvester, and has to do with a power driven device adapted first to remove the bean plants from the ground, then separate the beans from the stalks, and subsequently discharge the denuded bean plant from the device at one part thereof, and collect the beans at another part thereof, freeing the latter from dirt.

The invention here shown is an improvement upon the applicant's bean harvester Patent Numbered 1,727,020, issued September 3, 1929.

Included in the objects of the invention, among others, are the following:—

An improved means for lifting a bean stalk from the ground.

A new and novel means for conveying harvested stalks to a position from whence the pods thereon may be removed.

A new and novel means for removing the pods from harvested stalks and which is adapted to hook or rake the stalks in an upwardly direction beginning at the top thereof, and moving downwardly until the stalk for its entire length has been completely raked, after which the stalks are raked from the bottom upwardly whereby to insure the removal therefrom of all bean pods.

The provision of a means for the removal of leaves, pieces of stalk, and foreign matter from harvested bean pods.

These, and such other objects as may hereinafter appear, are obtained by the novel construction, combination and arrangement of the several elements which constitute the invention, one embodiment of which is illustrated in the accompanying thirteen sheets of drawings, hereby made a part of this specification, and in which.

Like reference characters are used to designate similar parts in the drawings and in the descriptive matter which follows.

For convenience, the machine may be divided into its units, namely, main frame, transmission mechanism, pod-lifter and stalk puller, pod-pickers, and the elevating and cleansing mechanism.

The main frame construction

Reference should be had to Figures 1, 2, 3 and 4. The main frame of the device comprises three longitudinally extending main frame members 1, secured together by a plurality of transverse frame members 2.

Two bull wheels 3, one on each side of the frame and supporting said frame, are rotatably mounted on the stub axles 28, which are secured to the external frame members 1. Ring gears 27 are securely fastened to each of the full wheels 3.

Mounted in the forward end of the harvester frame and between the right hand two longitudinally extending main frame members 1 is a conventional form of internal combustion engine 9, which constitutes the prime mover supplying power to the harvester.

Also in the front of the machine, in a front wheel fork 43 which extends upwardly and rotatably through a supporting bracket 42 firmly secured to the frame of the harvester. In said fork 43 is a guilding or front wheel 4. A steering wheel 16 through suitable gearing controls the angular position of the guilding or front wheel 4 from an operator's seat 18, which latter is secured to a transverse frame member 17. Said steering wheel is secured to a rod 47 having as a part thereof a worm gear 5, which actuates gear 6 secured to the front wheel fork 43.

The transmission

Figure 13:
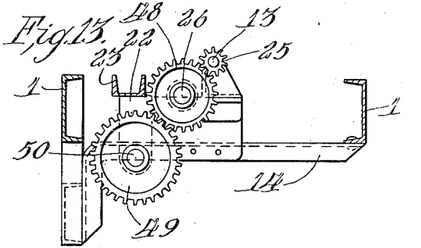
Figure 13 is a detail of the drive gears from the engine.

Extending rearwardly from the engine 9 to a transmission bracket 22, and mounted upon a transverse frame member 14 between the right two frame members 1 is a clutch shaft 13. A pinion 25 is secured to shaft 13 and drives a gear 48, which is secured to a rearwardly extending shaft 26. Gear 48 also drives a gear 49 which is secured to another rearwardly extending shaft 50.

Figure 14:
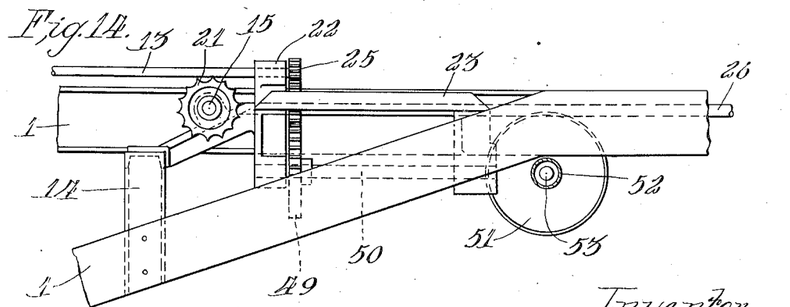
Figure 14 is a detail side view showing the differential drive.
Figure 15:
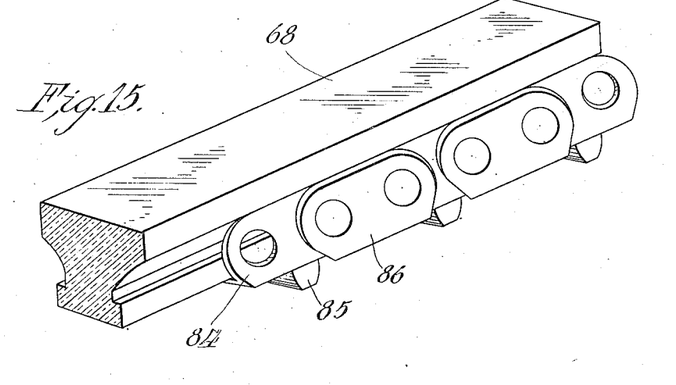
Figures 15, 16 and 17 are details in perspective of the stalk puller and the stalk carrier chain.
Figures 16, 17:
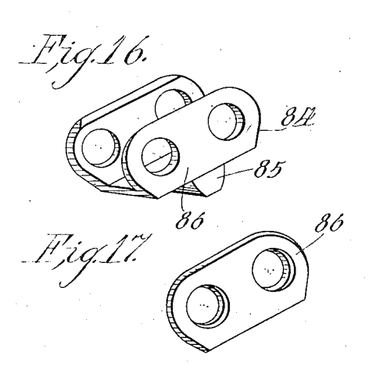

Shaft 50 extends to a differential 51 of conventional form and having shafts 53. Pinions 39 are secured to said differential shafts 53. Ring gears 27, which are securely fastened to the bull wheels 3, are driven by said pinions 39 which are housed in casing 52.

A bevel gear 20, secured to said shaft 26 at its front end drives a bevel gear 19 secured to a shaft 15. Said shaft 26 extends rearwardly from said transmission bracket 22 to a second transmission bracket 36 between the right two longitudinal frame members 1 and a suitable bearing. Bevel gear 29 is secured to the part of the shaft 26 which extends rearwardly beyond the transmission bracket 36 and drives a bevel gear 30 which latter is secured to a shaft 31.

A sprocket 35 is secured to said shaft 31. Another gear 37, which is secured to said shaft 26, drives a gear 38 fastened to a shaft 44. Shaft 44 has suitable bearings in said transmission bracket 36 and in another bearing bracket 41 mounted on a transverse frame member 2. A gear 45 is keyed to shaft 44 and drives a gear 32 which is mounted thereover and upon a shaft 40. A bevel gear 33 secured to said shaft 44 drives a bevel gear 34 secured to a shaft 46.

The clutch mechanism of the engine 9 may be controlled from the driver's seat by a foot lever 7 which is joined to the usual clutch controlling arm 12 by a rod 10.

The stalk puller and the pod lifter

Figure 1:
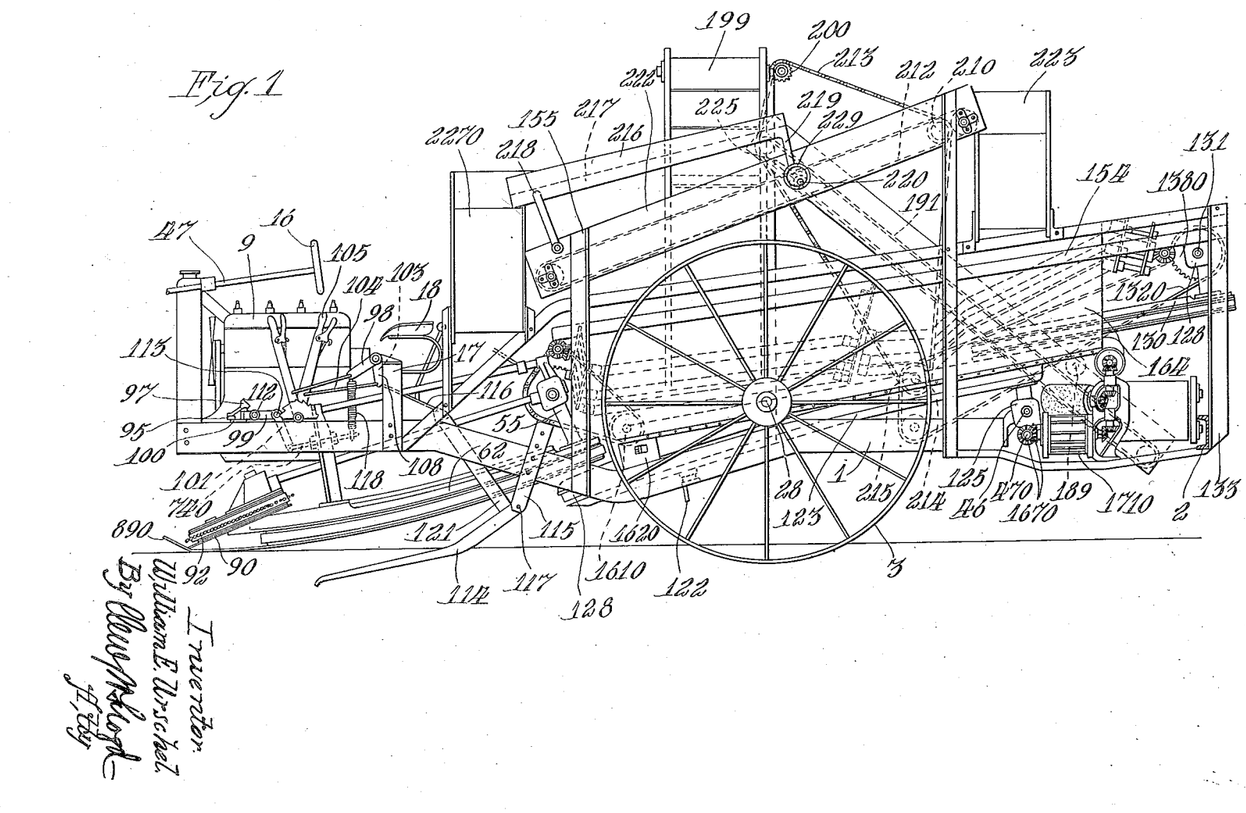
Figure 1 is a side view of a bean harvester embodying the subject matter of the present invention, the front or steering wheel and engine and housing therefor being omitted from the drawings.
Figure 2:
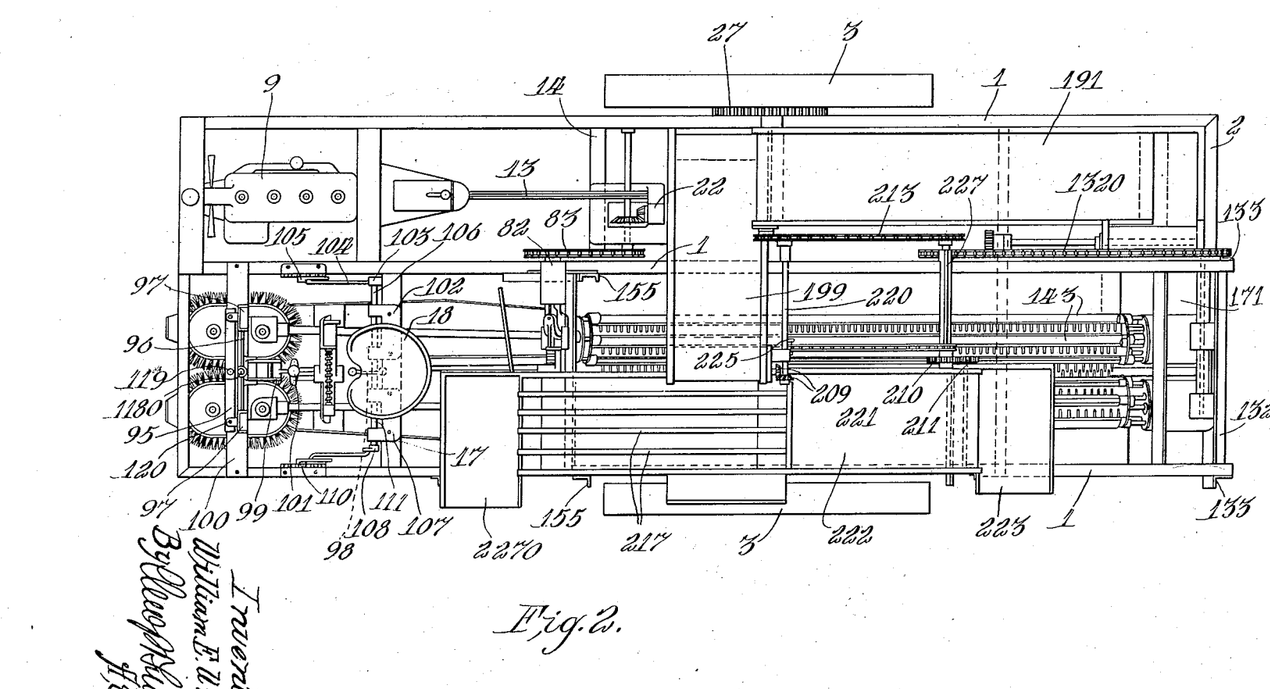
Figure 2 is a top view of the entire device illustrated in Figure 1.
Figure 3:
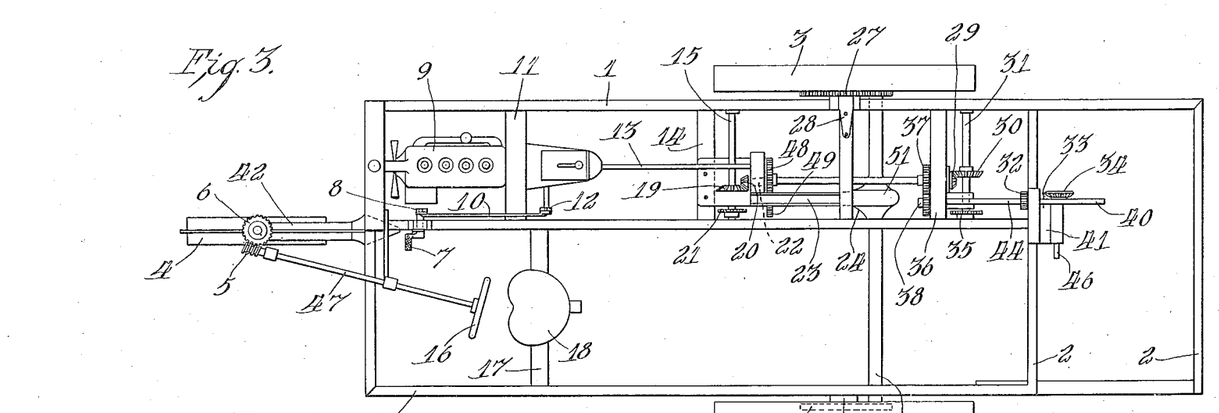
Figure 3 is a top view of the harvester frame disclosing the steering apparatus construction and drive.
Figure 4:
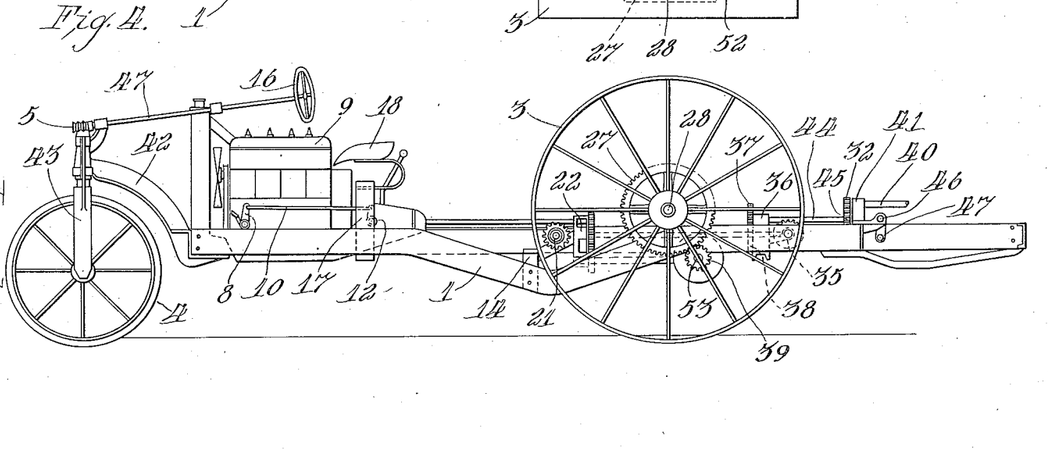
Figure 4 is a side elevation of the frame.
Figures 5, 6, 7:
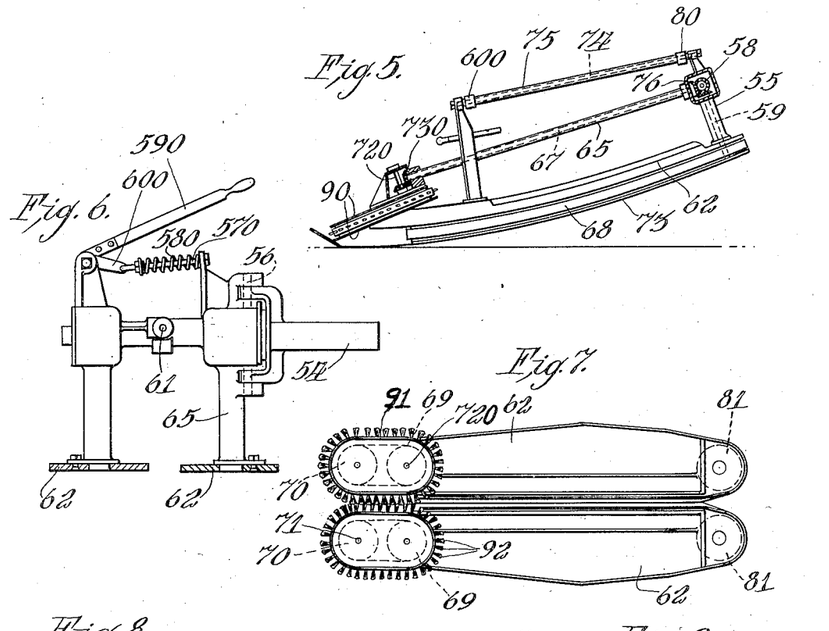
Figure 5 is a side elevation of the pod lifter and stalk puller illustrating the drive therefor.
Figure 6 is a rear view of the rear stalk puller arch support showing a spreader device therefor.
Figure 7 is a plan view of the pod lifter and stalk puller.
Figure 8:
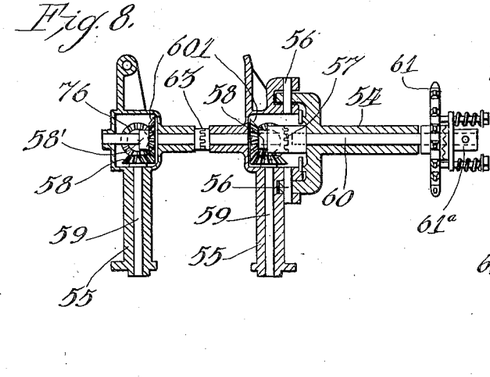
Figure 8 is a longitudinal section of the rear arch support.
Figure 9:
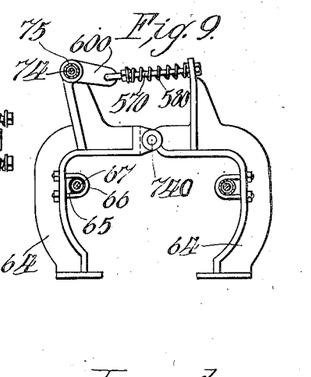
Figure 9 is a rear elevation of the front stalk puller arch support.
Figure 10:
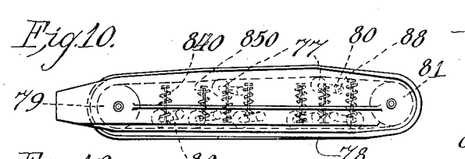
Figure 10 is a plan view of a stalk puller frame.
Figure 11:
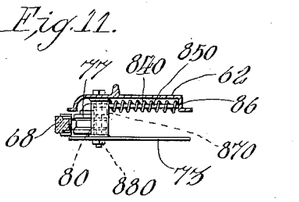
Figure 11 is a transverse section of the stalk puller frame.

Mounted at the front end of the machine between the left two frame members thereof are two oppositely disposed stalk puller frames 62. See Figures 5, 6, et seq. The stalk puller frames are held in spaced relation at the forward end by an arch bracket 64. The rear end of the stalk puller frames 62 is supported by a second arch bracket 55 which provides bearings for two vertical shafts 59 and the drivers therefor.

Said stalk puller is supported on the middle longitudinally extending main frame member 1 by a bearing bracket 82. The clevis 54 is free to turn in said bearing bracket 82, permitting the forward end of the stalk pullers to be raised and/or lowered.

A clevis 54 provides a bearing for a shaft 60. A sprocket 61 is secured to said shaft 60 and is driven by a chain 83 which runs on the driving sprocket 21.

A slip clutch 61a of any suitable type may be mounted upon said shaft 60 to prevent damage to the mechanism in case any foreign object, such as a stone becomes wedged between the stalk puller frames 62. Similar slip clutches while not shown in the drawings, may be mounted in such places where the mechanism may be damaged by such and other foreign objects.

The clevis 54 is hinged to the rear arch bracket 55 by pins 56 which permit the front end of the stalk puller to be guided transversely in keeping with irregularities in the bean row and an inability to drive the device with sufficient accuracy to provide exact registration with a row of bean plants at all times.

Shafts 59 are driven from shaft 60 by level gears 59' and 60'. Drive sprockets 81 which drive a rubber tired puller chain 68 are secured to said shafts 59.

The stalk puller chain includes main links 84 each having a projecting tooth 85 hinged to side plates 86 by rivets 87. Rivets 87 may turn in the main links 84 but are securely fastened in said side plates 86.

Figure 18:
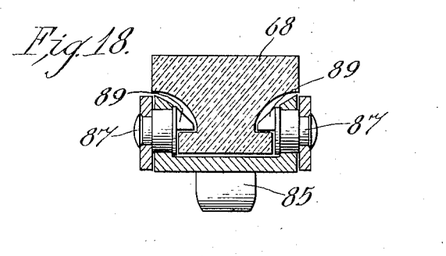
Figure 18 is a transverse section through said puller and stalk carrier chain.
Figure 19:
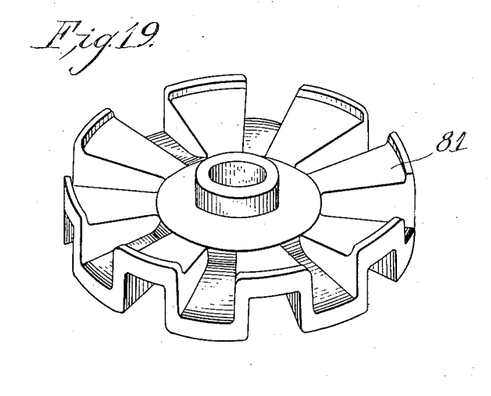
Figure 19 is a perspective view of the drive sprocket for the puller and carrier chain.

Mounted in the puller chain is an endless band 68 of yielding material such as rubber. Said rivets 87 have an inwardly projecting head 89 (see Figure 18) which fits into a groove in the endless rubber band 68 and which retains it in the channel of the puller chain.

The forward end of said puller frames 62 is provided with idler wheels 79. The puller chain 68 is pressed outwardly by a plurality of spring pressed idler rollers 77 which are rotatably journalled on pivoted arms 80. Said pivoted arms 80 are pressed outwardly by compression springs 840 mounted on rods 850, one end of which rod is mounted reciprocally adjacent the free end of the pivoted arms 80, the other end of which is secured in the stalk puller frame. The springs 840 exert a resilient tension to force the idler rollers 77 outwardly to provide sufficient tension to grip and hold bean stalks in a firm manner while they are being pulled from the ground.

The tension of the compression springs 840 may be adjusted by take-up nuts, one of which is supplied with each rod 850.

The underneath of the stalk puller frame is covered by a bottom plate 73 which is secured by bolts 880 passing through spindles 870 on which the arms 80 are mounted. The front end of the bottom plate terminates in a turned up portion 890 which serves to guide said stalk puller over the ground.

Mounted in front of and secured to the stalk puller is a pod lifting device consisting of drive sprockets 69 and idler wheels 70 mounted between plates 90. The idlers rotate on studs 71. The drive sprockets 69 are secured to a shaft 720 which is driven by shaft 67 through bevel gears 730. Bevel gear 601 secured to shaft 60 drives a bevel gear 76 which is secured to said shaft 67. Shaft 67 is mounted inside a tubular brace 65.

Figure 12:
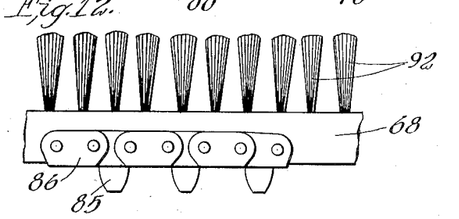
Figure 12 is a fragmentary view of the pod lifter chain.

The endless pod lifter chain 91 is of the same construction as the stock puller chain 68. The pod lifter chain 91, however, is provided with a plurality of bristles 92 which are positioned to run close together in proximity to the ground to raise any bean pods or stalks which are prostrate on the ground.

By employing two oppositely disposed stalk puller frames urged together by compression springs 580, the stalk puller frames may be made to spring apart. A lever 590 is adapted to be secured to a tubular member 75 mounted on rod 74 which is secured between the front and rear arch brackets.

One end of the spring rod 570 is mounted in the arm 600 which is secured to said tubular member 75. The other end of the spring rod 570 is mounted reciprocally in the arch brackets. In the event a stone or foreign object is wedged between the stalk puller frames, the tension of the springs 580 may be relieved by raising the hand lever 590 which elevates the arms 600 and draws apart the stalk puller frames. To permit the stalk puller frames to move in relation to each other, a flexible joint 63 is mounted on shaft 60 at the point where the arch brackets are hinged.

The stalk puller is supported at the forward end by an arm 98 which is secured to the extended pivot pin 740 by a spring 118. Spring 118 is used to provide a flexible support which will allow transverse movement of the stalk puller when it is guided along the row of beans.

Arm 98 is secured to a shaft 106 which has bearings in a bracket 102 and which is mounted on the transverse member 17. An arm 103, which is secured to the shaft 106, is connected to a hand lever 105 by a rod 104. By this mechanism the height of the stalk puller may be adjusted by the machine operator from his seat thereon.

The stalk puller may be moved transversely to guide it to register with a bean row by a foot lever 96 which is pivoted on a transverse member 100 between the left two longitudinal members 1 by pin 1180. Foot rests 97 are mounted on said foot lever 96 by means of studs set in the foot lever.

An auxiliary lever 95 is mounted slightly forward of and parallel to the foot lever 96 on said transverse member 100 by stud 119. Projections on the foot rests 97 are pivoted to said auxiliary lever 95 by means of studs 120 secured in the auxiliary lever 95.

By this arrangement, the foot rests 97 are at all times in a transverse position with the machine. The foot lever is joined to the stalk puller by a hinged coupling consisting of the two members 99 and 101. Member 99 is secured to the foot lever by pin 112. Member 101 is hinged to the member 99 by a pin 113 in order to permit the stalk puller to be adjusted to height. Member 101 terminates in a ball and socket joint by which it is joined to the stalk puller.

Under certain conditions, it may be desirable to mount a plow or lifter 114 beneath the stalk puller to assist it in raising bean plants. The plow or lifter is adapted to run in the ground under the roots of the bean stalks and to raise the bean stalk as they are being conveyed by the stalk puller. When the ground is hard or packed, the plow will prevent the breaking of the stalk from the energy of the puller. The plow or lifter is of special advantage when the stalks are lying prostrate on the ground or when the stalk is of such a type that the bean pods grow near the ground.

In such instances as when it is not possible to lift the bean pods above the grip of the stalk puller chain and the bean pods pass between the chains, the tension on the puller chains may be reduced to such an extent that the pressure of puller chains will not be enough to bruise or mash the bean pods. When used in this manner the stalk puller acts as a conveyor to carry the bean stalks to a position where they may be grasped by the stock carrier while the plow acts as a means for raising the bean stalks from the ground.

The plow is pivoted on studs 117 set in brackets 115 which are secured to the main frame members. A bracket 121 mounted on the arch shaped portion of the plow 114 which extends over the stalk pullers is connected to the arm 108 by a rod 116. Arm 108 is secured to shaft 111 which has suitable bearings in bracket 107. Arm 98 secured to shaft 111 is connected to hand lever 110 by which the operator may control the height of the plow from his seat.

The stock holder mechanism

Figure 25:
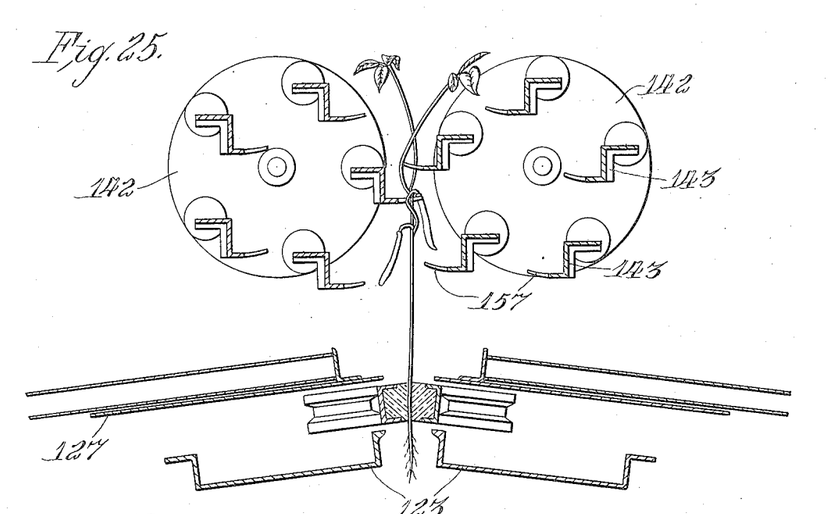
Figure 25 is a detail, in section, of the pickers and the stalk carrier.
Figure 26:
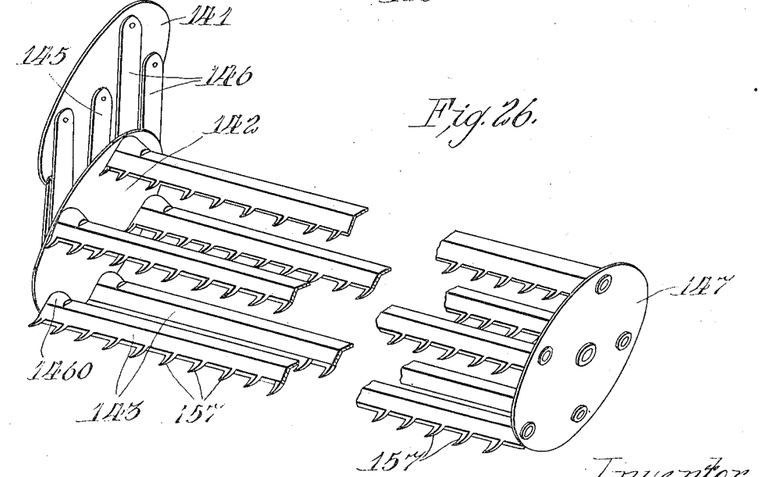
Figure 26 is a fragmentary perspective view of the front section of pickers.
Figure 27:
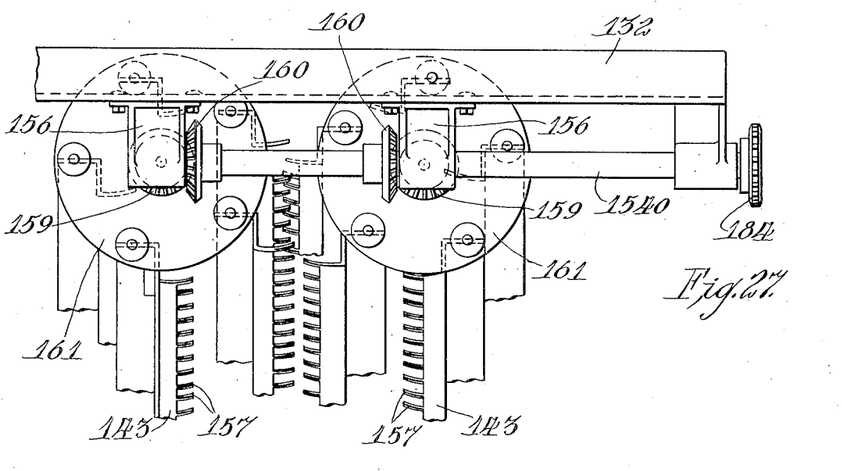
Figure 27 is a rear view of the rear section of pickers showing the manner of driving such pickers.
Figure 28:
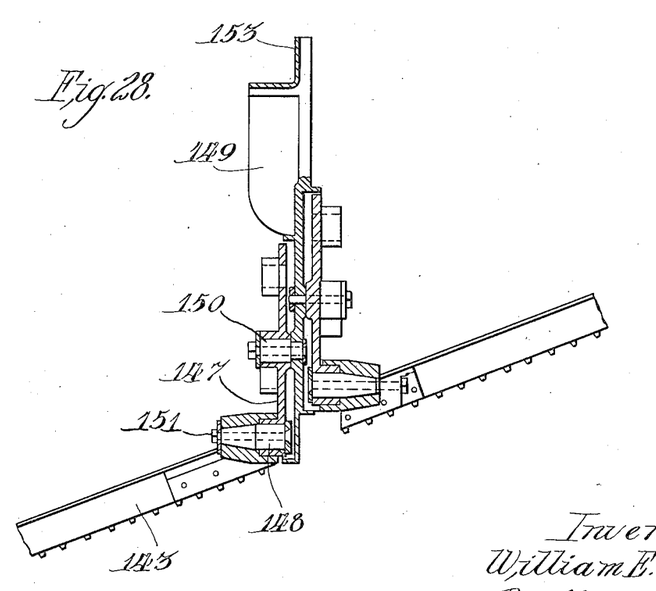
Figure 28 is a longitudinal section through the central picker bearings.

To grip and convey the bean stalks while the pods are being picked from the bush, a stalk holder 123 is mounted to the rear of the stalk puller in such a manner that the bean stalks are grasped and conveyed rearward after being released by the stalk puller. (See Figure 20). To permit the picker fingers to pass through the stalk as low as possible, the stalk is grasped by the root portion extending below the stalk puller. The stalk holder is constructed similar to the stalk puller having the same idler rollers, sprockets and carrier chain. The two oppositely disposed stalk carrier frames are set at an angle as shown in Figure 25 in order to permit the picker fingers to comb the stalk as near the roots as possible.

The stalk carrier is supported at the forward end by a transverse member 122. The rear end is supported by an arch bracket 125 secured to a transverse frame member 2. The arch bracket 125 contains bearings for said carrier drive shaft 44 which, by bevel gears, drives the shafts to which the carrier chain drive sprockets are secured. A cover plate 127 is secured to the stalk carrier frame in the same manner as the bottom plate is secured to the stalk puller.

Mounted to the rear of the stalk carrier is a stalk discharge 130 which is adapted to grasp the stalks as they are released by the stalk holder 123 and convey them rearward as the top of the stalk is being recombed by the rear pickers. The stalk discharge also acts as a means to evacuate the picked bean stalks from the machine. In construction the stalk discharge is similar to the stalk puller.

Said stalk discharge is supported by an arch bracket 128 secured to a transverse member 132 which is fastened to the upright members 133. The arch bracket 128 contains bearings for a shaft 131 which the stalk discharge chain in the same manner as the shaft 46 drives the stalk carrier chain. A sprocket 1280 secured to the shaft 131 is driven by chain 1320 which runs on drive sprocket 35.

The pod picking mechanism

Mounted over the stalk carrier are the pod pickers which are supported in a frame made up of the two longitudinally extending members 154 secured to transverse members 134, 132, and 153. Said longitudinal members 154 are secured to upright members 133 and 155 which are fastened to the main frame members 1 of the harvester.

The pod pickers comprise two sections, a forward section, and a rear section. Each section has two oppositely disposed revolving picker drums which have fingers adapted to hook under the stem of the bean pod and pull it loose from the bush.

Figures 20, 23, 24:
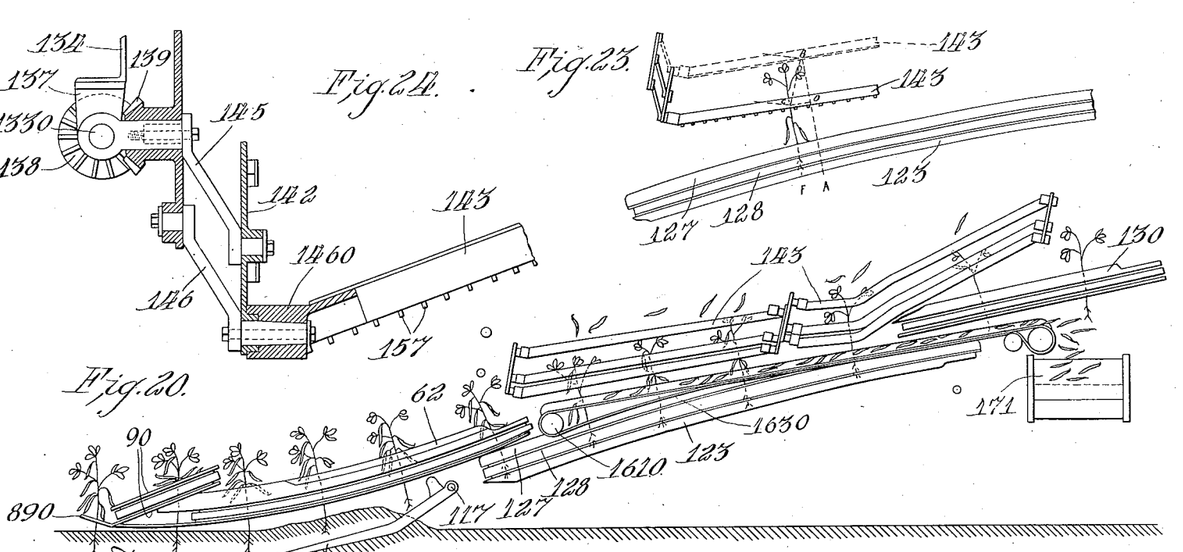
Figure 20 diagrammatically shows the principle of operation of the harvester and the relative position of the stalk puller, the stalk carrier, the pod pickers, and the discharge belts.
Figure 23 diagrammatically illustrates in a side view the pickers and stalk carrier and their relative speed.
Figure 24 is a detail, partly in section of the driven end of the front section of pickers.
Figure 21:
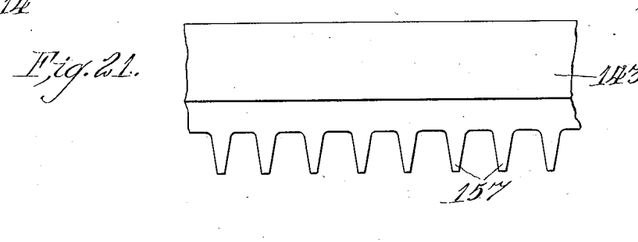
Figure 21 is an enlarged fragmentary plan view of the picker fingers.
Figure 29:
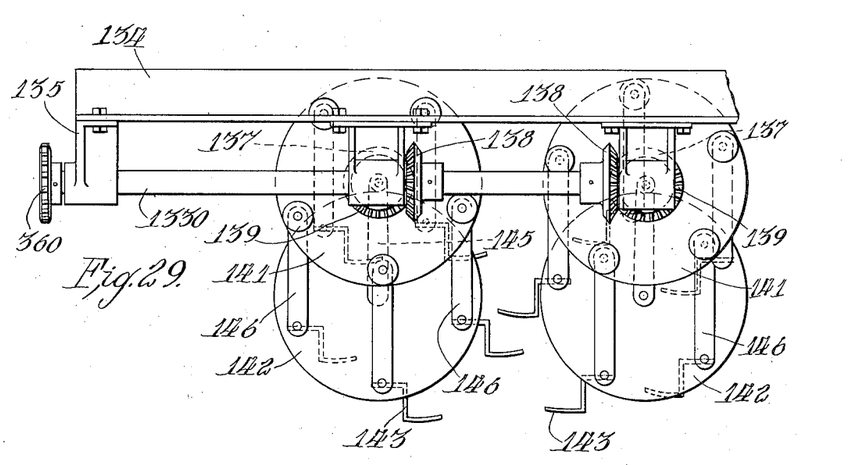
Figure 29 is an elevation of the drive end of the front section of pickers.
Figure 30:
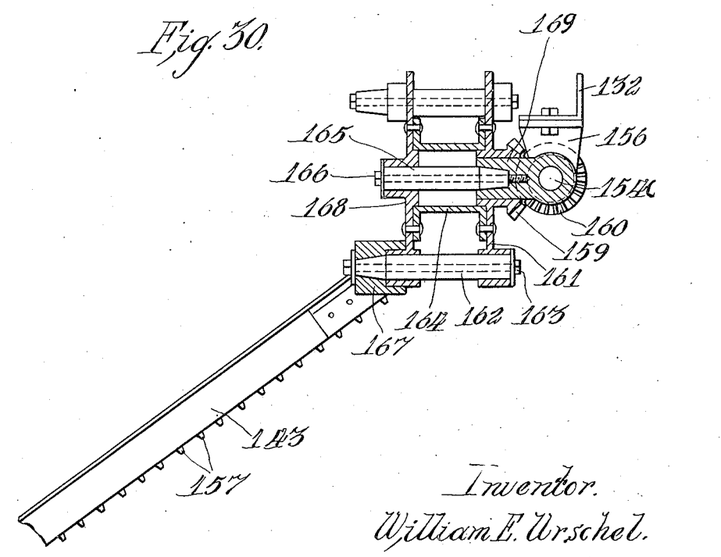
Figure 30 is a longitudinal section through the rear section of pullers.

Referring to Figures 24 and 29, it will be seen that the forward section of pickers is driven by a shaft 1330 on to one end of which is secured sprocket 360 driven by said chain 83 from sprocket 21. Gear 138 secured to shaft 1330 drive gear 139 which is secured to a circular drive plate 141.

Drive plate 141 is rotatably mounted on a bearing projection on bearing bracket 137 which also serves as a bearing for shaft 1330. A stationary central arm 145 secured to the bearing projection on bracket 137 terminates in a stud on which the end plate 142 is rotatably mounted. The five arms 146 are mounted between the drive plate 141 and end plate 142 by means of studs secured in said arms 146.

The picker fingers terminate with a knob 1460 which is securely fastened to the arms 146 by a taper pin. The arms 146 will remain in a vertical position as the pickers revolve which will hold the picker fingers in a position best adapted to pick the bean pods from stalks.

Figure 22:
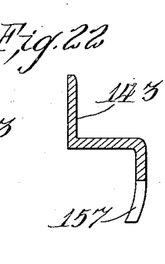
Figure 22 is an enlarged transverse section through a picker finger.

The picker fingers, which have a cross section as shown in Figure 22, consist of a strip 143 having a plurality of picking fingers with a turned up portion 157 which is adapted to hook under the stem of the bean pod as the picker fingers pass through the bean stalk.

The rear end of the forward pickers is supported by the bracket 149 which is secured to the picker frame members 153. End plate 147 turns on a stud 150 secured in bracket 149. Pins 148 are secured to the picker fingers by a bolt 151 and pins 148 are mounted in bearings in the end plate 147.

The fingers of the pullers move inward and upward through the bean stalk beginning at the top of the stalk and gradually working down to the bottom. As the pickers pass through the stalk, the fingers of the pickers hook under the stem of the bean pod between the pod and the stalk and pull the pod free from the stalk.

The forward section of pickers act more as hooks due to the width of the space between the picker fingers which will permit the pods to pass between the fingers. These pickers will pass through the stalk without severely jerking the stalks or pulling them from the grip of the stalk carrier. After the forward section of pickers have passed through the bean stalk the greater part of the bean pods are pulled and the clusters of leaves and pods are broken up. It is then possible to have the fingers of the rear section of pickers set closely enough together that a bean pod will not pass between the fingers. Thus the remaining bean pods are combed from the stalk beginning at the bottom and gradually working to the top.

In construction the forward end of the rear pickers is the same as the rear end of the forward section of pickers. The rear section is driven by a shaft 1540 which runs in bearings 156 mounted on the transverse picker frame member 132.

Sprockets 184 secured to shaft 1540 is driven by chain 1320 which runs on sprocket 35.

Bevel gear 160 is mounted on shaft 1540 and drives a bevel gear 159 which is secured to a drive plate consisting of a plate 161 secured to a plate 168 by a hub 164. The drive plate is rotatably mounted on said bearing bracket on bearing projection 169 and pin 165 also secured in said bearing projection 169.

Pins 162, which are secured to a knob 167, on the end of the picker fingers by a bolt 163, pass through bearings in the drive plate. Due to the angle between the picker fingers and the drive plates, the picker fingers will act in movement the same as the arms 146 of the front section. This action will hold the fingers in the desired position.

Referring to the diagrammatical view disclosed in Figure 23, the line C—B represents the plane through which the picker fingers travel. The line A—B indicates a position of a bean stalk after a movement of C—D. In order for the picker fingers to pass through the bean stalk with the least amount of resistance, the relative speed of the picker fingers and stalk carrier should be such that should point C, representing a point on the plane of the picker fingers C—B, and line C—F, move to a new position at point B, it will fall on line A—D on the new position of the bean stalk. The speed at which the stalk is carried by the stalk carrier should be the same as the speed at which a picker finger moves rearwardly. This rearward movement of the fingers is produced by the angle at which the drive plates of the pickers are mounted in respect to the stalk carrier.

The elevating and cleaning mechanism

Mounted over the stalk carrier and under the pickers are two discharge belts 1630 and 186, which carry the picked bean pods to the rear of the machine. Front idler rollers 1610 are supported on the outside by brackets 1620 containing suitable belt tighteners which are secured to the main frame members 1. The inside ends of the idler rollers 1610 are supported by similar brackets secured to the top plate 127 of the stalk carrier.

The left drive roller 182 of the left discharge belt 1630 is supported by a bearing bracket 178 on one side and a bracket 189 on the other. Said left drive roller, which is secured to a shaft 183, is driven by a shaft 181 through bevel gears 1690. Shaft 181 is driven by a shaft 190 by bevel gears 179. Said shaft 190 is driven by shaft 470 through bevel gears 1670. Shaft 470 is driven by shaft 46 by spur gears 165.

Figure 32:
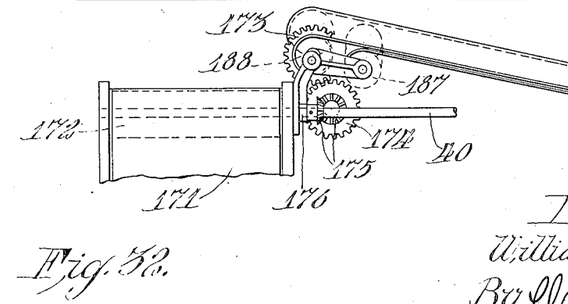
Figure 32 is a side view in detail of the right hand discharge belt drive.

The right discharge belt 1680 is driven by a roller 188 which is secured to a spur gear 173. Spur gear 173 is driven by a gear 174 which is driven from shaft 40 through bevel gears 175.

Figure 31:
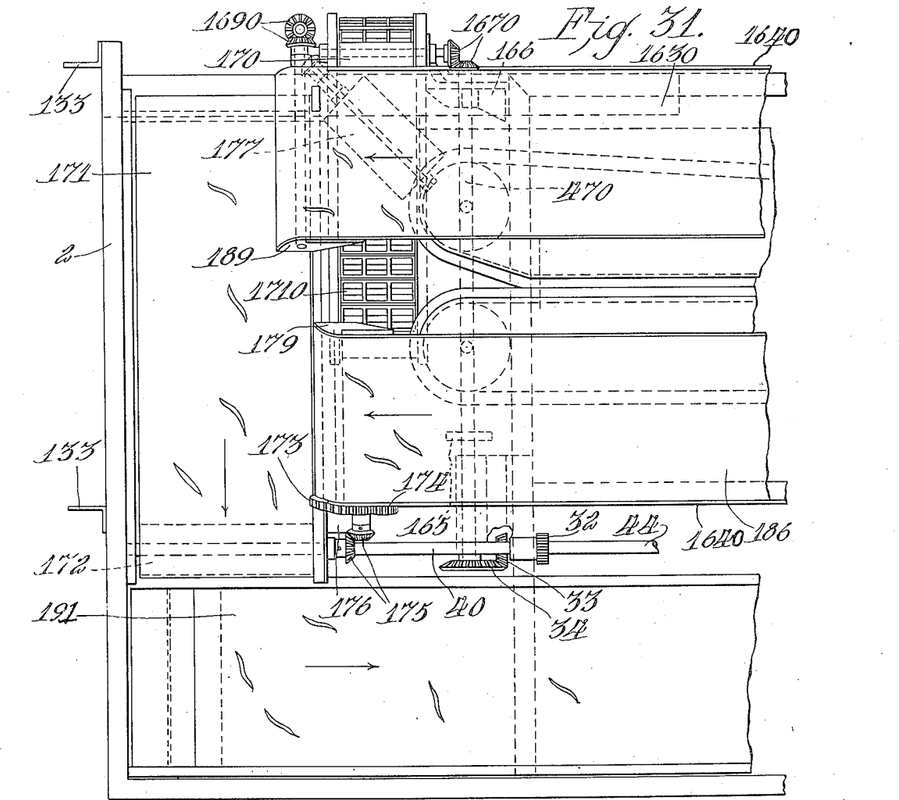
Figure 31 is a plan view of the rear of the machine disclosing the discharge belts, conveyor belts and cleaner chain.
Figure 33:
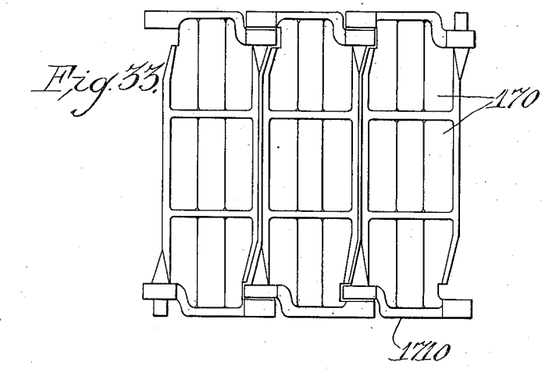
Figure 33 is a plan view of a fragment of cleaner chain.
Figure 34:
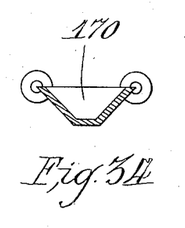
Figure 34 is a transverse section through a pocket of the cleaner chain.

Mounted at the rear of and below the discharge belts is a transverse belt conveyor 171 which receives the bean pods from the discharge belts and conveys them to an elevator 191, said conveyor 171 driven by shaft 40 to which a drive The bean pods which, when picked, drop on the stalk carrier chain are carried to the rear of the machine on the stalk carrier chain and discharged by a cleaner chain 1710. The cleaner chain is made up of a plurality of pocketed or dished link members 170, as shown in Figures 33 and 34.

Figure 35:
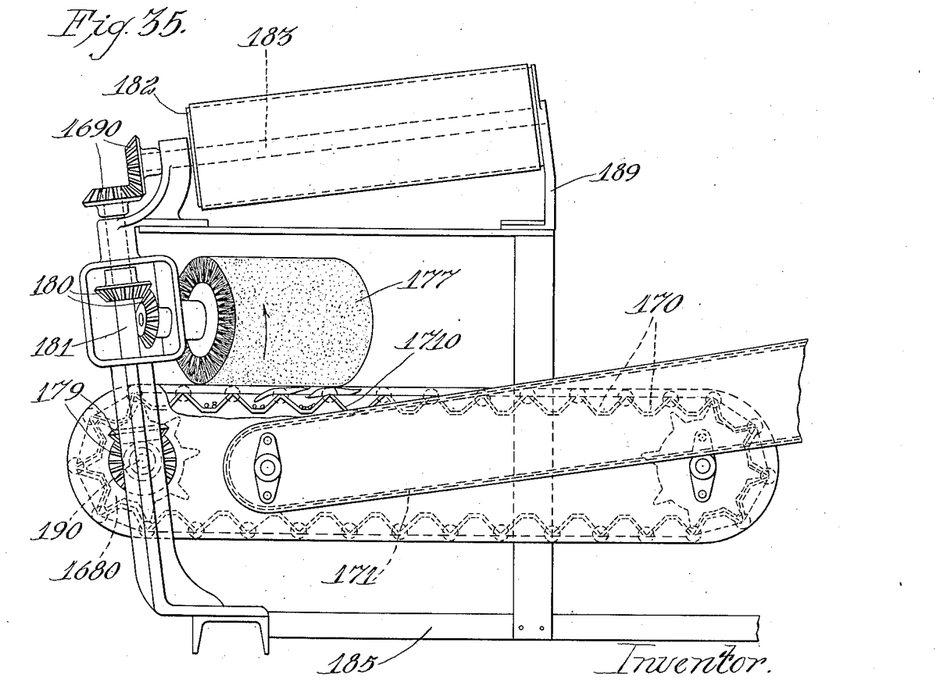
Figure 35 is a transverse section showing the cleaner chain and associated parts.

The endless cleaner chain is driven by sprockets 1680 which are secured to shaft 190. A rotary brush 177 is mounted in such a manner that the bristles bear on the top of the cleaner chain 170. The spindle for said brush 177 which has suitable bearings in bracket 178 is driven from shaft 181 by bevel gears 180.

The purpose of said cleaner belt is to separate the bean pods from the dirt which is carried on the stalk carrier chain. The bean pod will lay on top of the cleaner belt while all the dirt will fall into the pocket in the cleaner belt. As the cleaner belt moves to the side of the machine, the rotary brush 177 will sweep the bean pods from the cleaner belt on to the conveyor belt 171. The dirt that is collected in the pockets is carried to the side of the machine where it is discharged.

Figure 36:
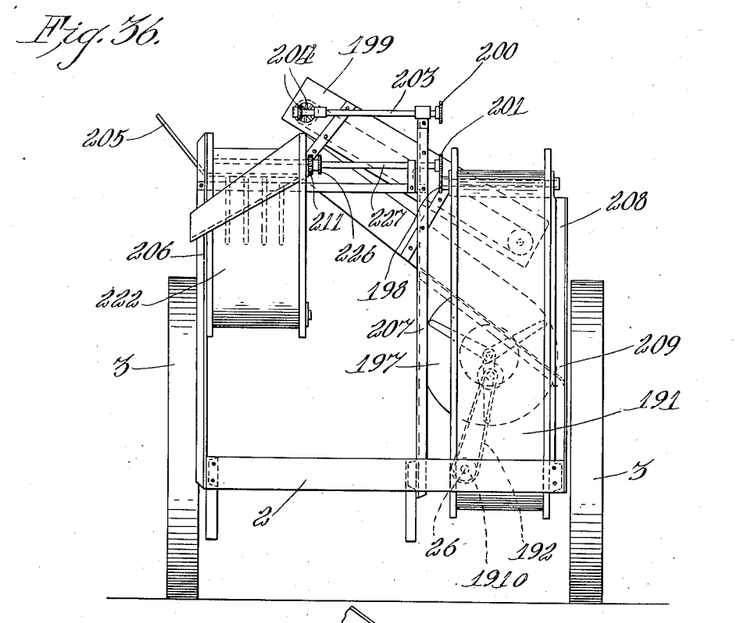
Figure 36 is a rear elevation showing the fan and elevators.

An elevator 191, which is driven by a chain 213 running on a sprocket 198 carries the bean pods upwardly and discharges them on elevator 199 which is driven by a shaft 203 through bevel gears 204.

Shaft 203 is driven by chain 213 which runs on sprocket 200.

Elevator 199 discharges the bean pods on to a shaker 216. Mounted under the elevator belt 199 is a fan 197 which is so positioned that an air blast will pass through the bean pods as they fall from the elevator belt 199 to the shaker. The force of the air stream will remove the leaves from the bean pods.

Figure 37:
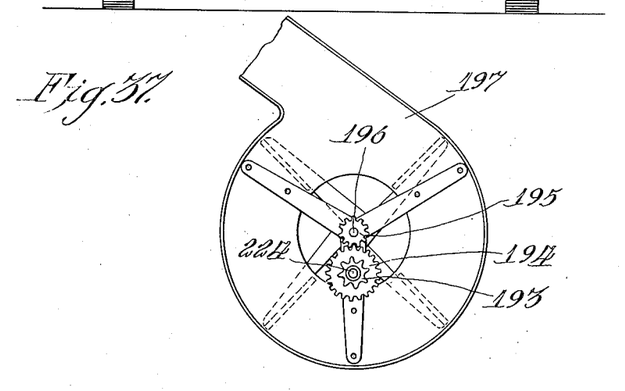
Figure 37 is a detail of the fan showing its drive.

A gear 195 secured to a fan spindle 196 is driven by gear 194 which is mounted on stud 224. A sprocket 193 secured to gear 194 is driven by a sprocket 1910 through chain 192. Sprocket 1910 is secured to the shaft 26.

The shaker 216 which is made up of spaced apart slats 217 and is supported at one end by arms 218 and by eccentric arms 219. An eccentric 229 imparts a reciprocating motion to the shaker and is driven by shaft 220.

A sprocket 225 secured to shaft 220 is driven by sprocket 226 through chain 221. Sprocket 226 is secured to a shaft 227 which is driven by chain 213 running on a sprocket 201. When the bean pods fall on the shaker, the pods are shaken through the slats of the shaker onto the conveyor 222. The bean stalks are passed down the shaker to a slide 2270 and are there discharged from the machine.

The pods which are discharged from the shaker are carried to the rear of the machine by said conveyor 222 which discharges them on to a slide 223. The conveyor 222 is driven by a gear 211 which is secured to the drive roller spindle. Gear 211 is driven by gear 210 which is secured to said shaft 227. The chain 213 is driven by a sprocket 215 secured to a shaft 214 which is driven by chain 1320.

The operation of bean harvester

The harvester is propelled on its own power down the row of bean stalks so that the machine passes over the row with the line where the two endless puller chains run together directly registering with the bean row. When the machine is operated along a row in this manner, the bristles in the pod lifter, brush the bean pods up from the ground and lift and maintain the prostrate stalks in an upright position.

The bean stalks are next engaged, adjacent to the ground, between the endless rubber tired puller chain. Due to the curve of the stalk puller, the bean stalks are gradually lifted from the ground. The plow or lifter passing under the bean row assists the stalk puller in raising the bean stalks from the ground.

As the bean stalks are lifted from the ground, they are elevated and concurrently conveyed to a position where they are grasped at the roots by the stalk carrier.

As the stalks are conveyed rearward by the stalk carrier, the picker fingers pass through the top of the stalk and gradually work down until the complete stalk is combed. The stalk is then grasped by the stalk discharger and to be conveyed further rearwardly.

At this instant, the pickers begin to recomb the bush beginning at the bottom and gradually working to the top until the stalk has been recombed by the pickers and all the pods removed from the stalk.

As the pods are pulled from the stalk, they drop on the discharge belts and are carried to the rear of the machine onto the elevator 171. A shield 1640 of sheet metal guides the bean pod on the discharge belts. Elevator belt 171 carries the pods to the right side of the harvester and discharges the pods on to the elevator 191 which conveys and elevates the pods to elevator 199.

As the pods fall from elevator belt 199 to the shaker, a current of air passes through the pods which removes the leaves and foreign objects. The bean stalks and parts of the stalks are moved down the shaker by its reciprocating motion and the bean pods are shaken through the slots onto the conveyor belt 222.

The bean stalks are discharged from the shaker to the ground. The bean pods are conveyed rearwardly and discharged by the conveyor 222 onto the slide 223 which guides the pods into a suitable container such as a bag or basket which may be carried upon the machine.

When conditions are favorable, as when the bean stalks are standing in good shape, the pod lifter attachment may be removed without affecting the performance of the machine. When the ground is soft and other conditions favorable, the plow also may be removed. The stalk puller is capable of pulling the bean stalks without the aid of the plow under favorable conditions.

I claim:

1. A bean harvester comprising the combination of means for brushing upwardly the lower portion of a bean plant, means for gripping the plant adjacent the ground, elevating means for lifting the plant from the ground, conveying means adapted to move the plant in a linear path in alignment with its course of travel through said elevating means for gripping the plant at its roots when elevated and holding said plant thereby, and means for hooking the pods from the plant while travelling in said linear path.

2. A bean harvester comprising the combination of a means for brushing upwardly the lower pods of bean plants, means for gripping the plants adjacent the ground and in that portion above which said pods have been brushed, elevating means for the plants, a device for breaking the ground about the roots of said plants, conveying means adapted to move the plant in a linear path in alignment with its course of travel through said elevating means for gripping the plants at their roots and holding said plants thereby, and means for raking the pods from the plants while held by the roots and while travelling in said linear path, said brushing means, gripping means, elevating means, and conveying means conveying the plants in a continuous straight line through said harvester.

3. A bean harvester comprising the combination of a plurality of mechanisms adapted to convey bean plants rearwardly therethrough in a continuous straight line and with continued elevation comprising means for brushing upwardly the lower pods of the plants, means for gripping the plants adjacent the ground, elevating means for the plants, a device beneath said elevating means for breaking the ground about the root of the plants, conveying means for gripping the plants at their roots and holding said plants thereby, and means for raking upwardly through the plant from the top thereof downwardly and then upwardly to deprive it of its pods.

4. In a bean harvester, conveying means in combination with means for lifting the pods of the plants, and means for gripping the bean stalks beneath said lifted pods as they enter the machine.

5. In a bean harvester, a harvesting device comprising an instrumentality for brushing the lower pods and leaves upwardly upon the plant stalks, and means for engaging the bean stalks about the cleared sections as said stalks enter the machine.

6. In a bean harvester, the combination of means for conjointly holding and conveying bean stalks, and a plow or lifter for penetrating the dirt adjacent and to the rear of said stalks as they are held by said holding and conveying means.

7. In a bean harvester, the combination with a harvesting instrumentality conjointly holding and conveying bean stalks by elevating them from the ground, of a plow or lifter disposed therebeneath and to the rear thereof and adapted to lift the stalks by penetrating the ground therebeneath subsequently to being gripped by said instrumentality and before being lifted thereby.

8. A means for pulling bean stalks and conveying them to a position in a harvester where they may be gripped by a stalk holder, comprising a lifting member adapted to move rearwardly at a speed in synchronism with the forward speed of the harvester, in combination with a ground breaking device carried by said harvester disposed therebeneath adapted to break the ground adjacent the roots of the plants anterior to conveying them into said harvester.

9. A means for pulling bean stalks and conveying them into a position where they may be gripped by a stalk holder in a harvesting machine, and comprising endless belts adapted to grip stalks from opposite side and moving rearwardly in said harvesting machine at a speed equal to the forward movement thereof, in combination with a plow having a point in alignment with the abutting edges of said belts and adapted to loosen the dirt about the roots of stalks subsequent to their being gripped by said belts.

10. In a harvesting machine, pickers for beans in linear alignment and means for conjointly holding and conveying bean stalks past said pickers while the pods are being pulled therefrom.

11. In a bean harvester, means for lifting the bean plants from the ground, pickers, and means for holding the bean stalks and for conveying said bean stalks to the rear of said harvester while the pods are being pulled by said pickers.

12. A harvester for pulling pods from a bean plant and comprising a member having fingers penetrating the foliage of the plant and adapted to be moved therethrough, means for moving said member, another fingered member of the same character, means for moving said second member, and a conveyor for said plant for causing relative movement between said plant and said movable members whereby the fingers of said first named member rake upwardly through the foliage of the plant with successive raking movements of said fingers progressively approaching the bottom of the plant, and the fingers of said second member raking through said foliage with the path of the raking movement progressively approaching the top of said plant.

13. In a bean harvester, a conveying means for moving bean plants in a predetermined path, in combination with means for pulling pods from the plants in said conveyor, said pulling means comprising members angularly disposed to the path of plants in said conveyor and having fingers arranged in rows, and means for moving said members transversely of the path of the plants in said conveyor, certain of said pulling members raking the plants in said conveyor from the top downwardly, and other members raking the plants in said conveyor progressively from the bottom upwardly coincidentally with the movement of said plants in said conveying means.

14. In a bean harvester, an elevating device adapted to hold the bean plants adjacent to their roots, and means for picking the pods from such plants so held, in combination with means for separating the pods and the plants, means for cleansing said pods, and means for conveying the pods to a receptacle for collection.

15. In a bean harvesting device, means for separating the pods from the stalks, means for conveying the pods to a cleaning device, and a cleaning device comprising a plurality of pockets in association with a brush, dirt being adapted to be discharged by said belt and the beans segregated therefrom by said brush.

16. In a bean harvester, means comprising two groups of fingers for pulling bean pods from a stock, the fingers of the first group being spaced at greater intervals than those of the second group, said first group of fingers being arranged to comb said stock beginning at the top of said stock and working downwardly, and the second group of fingers being arranged to engage said stock subsequently to the engagement of said first group of fingers and to comb said stock beginning at the bottom thereof and working upwardly.

WILLIAM E. URSCHEL.